United States Patent [19]

Hini et al.

[11] 4,105,012
[45] Aug. 8, 1978

[54] APPARATUS FOR CUTTING UP HARD AND BRITTLE MATERIAL

[75] Inventors: Paul Hini, Erlangen; Helmut Forster, Neunkirchen am. Brand, both of Fed. Rep. of Germany

[73] Assignee: Siemens Aktiengesellschaft, Munich, Fed. Rep. of Germany

[21] Appl. No.: 843,417

[22] Filed: Oct. 19, 1977

Related U.S. Application Data

[63] Continuation of Ser. No. 713,575, Aug. 11, 1976, abandoned.

[30] Foreign Application Priority Data

Aug. 20, 1975 [DE]  Fed. Rep. of Germany ....... 2537088

[51] Int. Cl.² .............................................. B28D 1/02
[52] U.S. Cl. ..................................... 125/16 R; 51/64
[58] Field of Search ............... 83/751, 781, 7; 125/12, 125/15, 16 R, 18; 51/64, 60, 163.1

[56] References Cited

U.S. PATENT DOCUMENTS

| | | | |
|---|---|---|---|
| 2,024,860 | 12/1935 | Hobart | 51/59 R X |
| 2,312,014 | 2/1943 | Wallace | 51/60 |
| 2,963,018 | 12/1960 | Mattson | 125/16 R |
| 2,998,676 | 9/1961 | Hawkins | 51/59 R X |
| 3,326,071 | 6/1967 | Bushman | 83/7 |
| 3,626,921 | 12/1971 | Lane | 125/15 |
| 3,637,190 | 1/1972 | Isaacson | 51/163.1 |
| 3,674,004 | 7/1972 | Grandia | 125/16 R |
| 3,678,918 | 7/1972 | Stauffer | 125/16 R |
| 3,760,289 | 9/1973 | Egleme | 125/18 |

FOREIGN PATENT DOCUMENTS 1,181,093  11/1964  Fed. Rep. of Germany ........ 125/16 R

*Primary Examiner*—Harold D. Whitehead
*Attorney, Agent, or Firm*—Kenyon & Kenyon, Reilly, Carr & Chapin

[57] ABSTRACT

A gang saw is used for cutting up hard and brittle material, particularly semiconductor material, in which saw there is a reciprocating movement of workpiece with a large amplitude and low frequency and an additional vibrating motion of the sawblades in the same direction with a low amplitude and high frequency permitting very thin wafers of large area and a plane cutting surface to be prepared.

10 Claims, 2 Drawing Figures

APPARATUS FOR CUTTING UP HARD AND BRITTLE MATERIAL

This is a continuation of application Ser. No. 713,575 filed Aug. 11, 1976 and now abandoned.

BACKGROUND OF THE INVENTION

The invention relates to an apparatus for cutting up hard and brittle material, such as semiconductor material in general and more particularly to such a method using a gang saw having sawblades arranged side by side in a vibration proof frame, the blades being studded with diamond granules.

Gang saws of this general nature are suited for cutting up hard, brittle materials and minerals like rock or quartz, and particularly, semiconductor material. The cutting up of semiconductor crystals, particularly those that are known as AIII-BV compounds such as, for instance, the well known two phase semiconductor material consisting of a compound of indium antimonide with inclusions of nickel antimonide, or also gallium arsenide, gallium phosphide or indium phosphide presents various difficulties when using known methods and apparatus. Typical examples of apparatus used for this purpose are high speed diamond saws as well as wire and gang saws. With the methods known heretofore, one obtains, for instance, relatively large cutting losses where semiconductor rods are to be divided into wafers, and the surface roughness of these wafers is relatively high. If semiconductor rods with a large diameter are cut up, cut surfaces are obtained which are not completely parallel to each other, and the surface is therefore not flat. In addition, the cutting takes a relatively long time and the depth of the saw cut is limited. The preparation of perfectly parallel and plane cut surfaces is particularly important if materials of high value are to be fabricated with a diameter of, say, 50 mm or more with low cutting losses as well as high surface quality and dimensional faithfulness.

A known gang saw for cutting quartz crystals into thin slices which are used in the manufacture of quartz oscillators contains a crank drive which acts via a sliding head on a mounting frame coupled to the former. In this mounting frame, a separate clamping frame for receiving the sawblades is provided. The blades are inserted with lateral play and are held in their position by special alignment means. The tightening forces, amounting to up to several tons, are taken up exclusively by the clamping frame. These large clamping forces can easily lead to a deformation of the clamping frame and it is therefore difficult to align the blades accurately in the mounting frame and to maintain the parallel direction of motion of the individual blades (U.S. Pat. No. 3,326,071).

The sawblades are therefore clamped in detachable mounting profiles which are bolted on and protrude between the legs of these mounting profiles. The mounting profiles which surround the one yoke beam of the clamping frame rest with their legs against the yoke beam over the entire length without play, while the mounting profiles surrounding the other yoke beam of the clamping frame are braced against the yoke beam in places and are cantilevered at their ends. The other yoke beam of the clamping frame is connected with the legs of the latter movably in the clamping direction, and is supported in the tightened position by adjustable supporting means, e.g., lock nuts. Through these design features, the bending of the clamping frame, which occurs under the tensioning action of the sawblades, is supposedly compensated. The cutting forces are obtained by feeding abrasives to the sawblades. These abrasives, contained in a liquid mixture, however, attack not only the material to be cut up, but also the sawblades and the wear is therefore accordingly heavy (German Auslegeschrift No. 2,039,699).

In an arrangement disclosed in U.S. Pat. No. 2,774,194 the cutting blades of a device for cutting up semiconductor material are provided with an ultrasonic drive and vibrate in the cutting direction. The blades are held over the entire length of their upper edge by means of a clamping device. With this known arrangement, however, the individual sawblades can be arranged only at a relatively large spacing from each other and the manufacture of thin wafers is therefore not possible.

For cutting up silicon rods, diamond cutting disks which are equipped with sintered-in diamond studding have also been used. These diamond disks are arranged side by side on a shaft and are separated from each other by spacers. Such tools for cutting semiconductor material, however, are suited only for relatively small saw depths. Therefore, only wafers with a relatively small area can be produced therewith. Steel bands, the surfaces of which are provided with diamond grains, can also be used for cutting rock and hard metals, as is well known. The diamond grains can be mechanically pressed into the band or may also be bonded by electroplating with a surface finish of a nickel or chromium coating. These bands are provided with cuts which are likewise filled with diamond grains. However, these bands are relatively thick and therefore result in correspondingly large cutting losses.

SUMMARY OF THE INVENTION

It is an object of the present invention to provide a method and apparatus which permits cutting up hard, brittle material in such a manner that the adverse effects mentioned above are avoided.

According to the present invention, this problem is solved by superimposing on the reciprocating motion of sawblades with a large amplitude and low frequency, a vibrating motion of the sawblades in the same direction with a small amplitude and high frequency. The material is therefore cut essentially by the vibrating motion of the sawblades, while the material taken off by the cutting process can easily be removed by the motion with the large amplitude, and the heating of the sawblades is limited.

The relative motion between the sawblades and the material to be cut is obtained by letting either the clamping frame for the sawblades or the material to be cut up execute the slow reciprocating motion. For this purpose, the material can be fastened, for instance, to the oscillating arm of a crank mechanism and moved back and forth with the latter. This reciprocating motion can be executed, for instance, at about ¼ Hz. The frequency of the vibrating motion, on the other hand, will not be chosen substantially lower than 10 Hz and will not substantially exceed 40 kHz. The frequency of vibration may be chosen preferably between 50 and 2000 Hz, and in particular, between 100 and 500 Hz. The amplitude of the reciprocating motion depends on the maximum dimension of the material which is to be cut up by the saw. The amplitude may, for instance, be 80 mm or also more than 100 mm. On the other hand, the amplitude of the vibration of the sawblades will be about 0.01 mm at a frequency of 20 kHz and, for instance, about 0.1 mm at a vibration frequency of 500 Hz. If the vibration frequency is chosen relatively low, then the amplitude can be correspondingly larger. With a vibration frequency of, for instance, 50 Hz, the amplitude of the vibration may be about 0.3 mm or even more.

A gang saw suitable for implementing the method utilizes thin steel bands in which at least the end face facing the material to be cut is provided with diamond grains as the sawblades. The vibrating frame of the sawblades is movable relative to the material to be cut has an additional vibration drive associated therewith. The sawblades are provided with holes whose distribution is chosen so that their cross section is less in the middle than the cross section at the two edges. These holes can preferably be chosen so that a different distribution of the tensile stress of the steel bands clamped in the frame is obtained. This tensile stress distribution increases from the lateral edges of the bands toward the inside and may advantageously approximately reach or even exceed somewhat, the elastic limit preferably in the middle of the band. With this design, one obtains greater stiffness of the bands and waviness if prevented. Thus, relatively large wafers with plane surfaces can also be produced.

The oscillating frame with the gang saw is suspended resiliently. For instance, leaf springs which are arranged transversely to the amplitude of the oscillation can be provided for the suspension. One thereby obtains adequate stabilization of the oscillating frame in the lengthwise direction and transversal or rotary movements of the sawblades are prevented. The spring constant of these leaf springs is adapted to the mass of the oscillating frame with the sawblades inserted. The oscillation itself can be produced, for instance, by an electromagnetic or a magnetostrictive vibration drive. Due to the slow reciprocating motion of the material in addition to the vibrating motion, the material taken off can be removed from the cutting gaps, for instance, by flushing with water or other lubricants. This flushing effect can be further enhanced if the vibrating frame is inclined with respect to the plane of the reciprocating motion. The angle of inclination may be, for instance, between 10° and 90°. For lowering the frame, a hydraulic system with overpressure protection may, for instance, be provided.

DETAILED DESCRIPTION OF THE INVENTION

Figure 1:
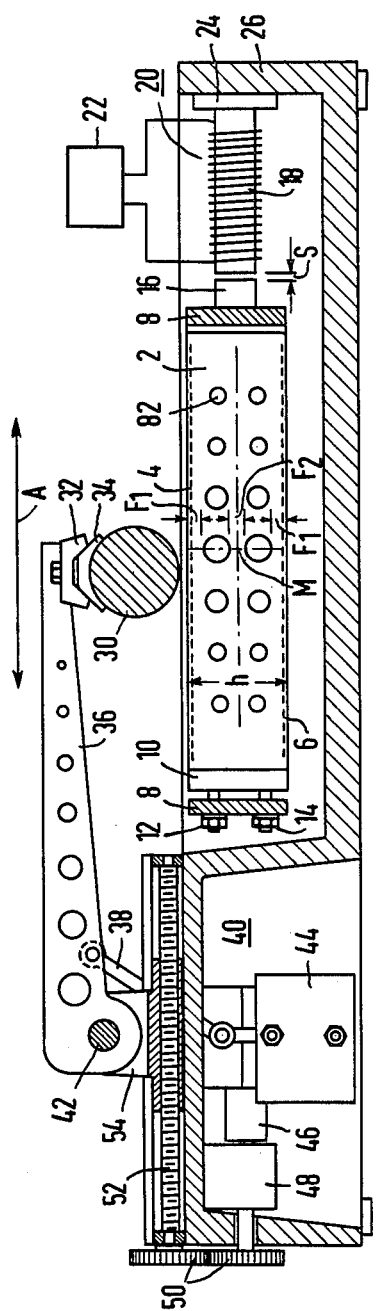
FIG. 1 is a longitudinal cross sectional view of a gang saw according to the present invention.

According to FIG. 1 a plurality of sawblades 2, the edges of which are provided with diamond coatings 4 and 6, respectively, each have one end inserted into a clamping frame 8. The opposite ends are held in a tightening device 10 which grabs the ends of the sawblades 2 and which is mounted by means of screws 12 and 14 in the clamping frame 8. The clamping frame 8 is provided with an iron core 16, the end face of which is arranged at a predetermined distance S opposite the pole surface of the iron core of a magnet coil 18, which is part of an electromagnetic vibration drive 20, the power supply 22 of which is merely indicated as a box in the figure. The magnet coil 18 of the vibration drive 20 is fastened, via a mounting device shown as a plate 24, to the frame 26 of the gang saw.

Above the sawblades 2, a rod shaped crystalline semiconductor body 30 is arranged. Body 30 is fastened to the mounting device 32 of an oscillating arm 36, for instance by cementing with a synthetic adhesive 34. The oscillating arm 36 is provided with a rocking lever 38 and is part of a drive mechanism 40 which is provided for moving the semiconductor body 30 back and forth in the lengthwise direction of the sawblades 2 with a relatively large amplitude and low frequency. This motion is indicated in the figure by the double arrow A. The rocker arm 38 can move the oscillating arm about the fulcrum 42. It is used to place the semiconductor body 30 on the sawblades 2 and to lift it off. The rocker arm 38 is actuated by a hydraulic system, of which only an oil cylinder 44 is shown in the figure. Part of the driving mechanism of the oscillating arm 36 is a motor 46, which drives a worm gear 52 via a transmission 48 and a gear drive 50. The worm gear 52 engages the support 54 of arm 36 and thus moves the oscillating arm in the lengthwise direction of the sawblades 2. If the rod 30 fastened to the oscillating arm for cutting is to be lifted off the sawblades or is to be placed on the sawblades 2, the oscillating arm is swung about the pivot 42 by means of the rocker lever 38. In addition, the contact pressure between the sawblades 2 and the body 30 to be cut up can be adjusted by means of the rocker lever 38.

Figure 2:
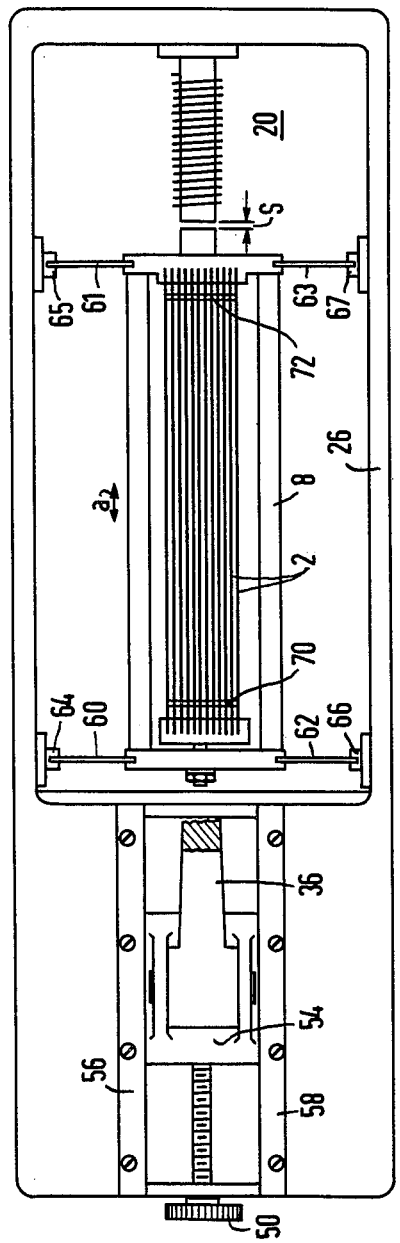
FIG. 2 is a top view of the saw of FIG. 1.

In FIG. 2, the attachment of the oscillating arm 36 to the driven support 54 can be seen. Support 54 is arranged movably between holders 56 and 58, which may advantageously be designed as slide rails. The clamping frame 8 is attached to the base frame 26 of the gang saw in such a way that it is movable in the longitudinal direction of the sawblades 2 with a small amplitude. For this purpose, leaf springs 60 to 63, are provided with one end of each fastened to the clamping frame 8 and the other end fastened to the base frame 26 by means of clamping devices 64 to 67. To adjust the exact spacing between the individual sawblades 2, separate spacers 70 and 72 are preferably provided, which are merely indicated in the figure.

The vibration drive 20 sets the clamping frame 8 into an oscillating motion via the air gap S and the iron core 16 with a small amplitude $a$ and high frequency. This is indicated in the figure by a double arrow $a$. With about 50 sawblades arranged parallel side by side, each preferably about 50 to 300 $\mu$m thick, particularly about 100 $\mu$m or less, and with a height $h$ of preferably at least 50 mm, an oscillating motion of about 100 to 500 Hz and an amplitude of 0.1 mm is chosen.

If the oscillating frequency is chosen substantially higher, for instance, about 2000 Hz, and in particular, about 20 kHz, then an amplitude of about 0.01 mm may already be sufficient for the cutting process. If, on the other hand, one works with a low vibration frequency of 50 Hz or less, then the amplitude of the oscillation can be chosen correspondingly higher, for instance, up to 0.3 mm or more. The amplitude A of the reciprocating motion of the body 30 to be cut up, on the other hand, is chosen substantially larger. It depends on the area of the body 30 to be severed and will in general be more than 50 to 80 mm and in particular, more than 100 mm. With an amplitude of, for instance, 80 mm the frequency can preferably be about $\frac{1}{4}$ Hz, so that one back-and-forth movement takes place in about 4 sec. The removal of the material sawed off can be further facilitated substantially be setting the sawblades 2 at an angle to the body 30 which is to be cut up, i.e. by inclining them in their lengthwise direction with respect to the motion A of the body 30. This facilitates the flow of any lubricating and cleaning agent that may be used, through the separating gaps.

In one preferred embodiment of the gang saw according to the invention, the sawblades are provided over their length with holes 82 or with profiled openings. The size and distribution of these holes 82 can preferably be chosen so that the cross section in the middle of the sawblades is smaller than at their edge. The size and distribution of the holes 82 are therefore preferably chosen so that the size of the cross sectional areas $F_1$ at the edge of the sawblades 2 is always larger than the cross-sectional area $F_2$ remaining in the middle. Due to this design, the tensile stress of the sawblades 2 clamped at their ends increases from the edge toward the middle. The lowest tensile stress prevails at the end faces of the sawblades where the diamond coating is applied. Through this measure, the stiffness of the clamped sawblades is increased and, in addition, separation of the diamond coating from the edge of the sawblades due to high tensile stresses can be limited.

It may furthermore be advantageous to make the size of the holes 82 different over the length of the sawblades 2. The holes in the middle of the sawblades are then given the largest diameter and the diameter of the holes becomes gradually smaller toward the two ends. With this distribution of the openings, the tensile stress in the clamped sawblade will decrease gradually from the center M toward all sides, i.e., in the lengthwise direction of the sawblade as well as in the crosswise direction.

Instead of with the holes 82, the sawblades 2 may optionally also be provided with slots or also with profiled openings. The distribution of the openings is chosen so that the elastic limit of the material, e.g., of steel, is just reached in the center of the sawblades or even somewhat exceeded. Thereby, greater stiffness of the clamped sawblades 2 is achieved and wavy deformations during the sawing, which would lead to non-uniformly cut surfaces, are largely eliminated.

Deviating from the distribution of the holes according to FIG. 1 several rows of holes may also be provided over the width of a sawblade, the diameter of which increases from the edge of the blade toward its middle. In addition, the distribution of these rows over the width can be chosen so that a larger cross section is obtained at the edge of the blade.

A movement of the sawblades 2 transversely to their longitudinal direction or twisting of the sawblades 2 is prevented by the spring suspension of the clamping frame 8 in the base frame 26. Also tilting of the clamped sawblades 2 is prevented in a similar manner by the frame suspension in the leaf springs 60 to 63. The spring force of these springs 60 to 63 is matched to the weight of the sawblades 2 with the clamping frame 8 and to the amplitude as well as the frequency of the oscillation.

In the illustrated embodiment, an electromagnetic drive is used as the vibration drive 20. The control 22 of this drive can preferably be chosen so that the magnetic core of the magnet coil 18 is given a d-c pre-magnetization, which exerts an attraction force on the clamping frame 8 via the iron core 16. On this d-c pre-magnetization, an a-c flux is superimposed, which interrupts the d-c pre-magnetization during one half-wave and aids it in the other half-wave.

Instead of the electromagnetic drive, other types of drive can also be used, however, such as an oscillator head which is excited magnetostrictively. Such oscillator heads excite their vibration via a nickel oscillator such as is common in ultrasonic engineering. The amplitude of the vibration can be changed by means of a special mechanical transformer.

The diamond coating 4 at the edge of the sawblades 2 can preferably be designed so that in addition to the end surfaces themselves, a small part of the flat sides of the sawblades 2 is also provided with the diamond coating. With this coating on the part of the flat sides which adjoins the end surfaces, one obtains saw cuts which are somewhat wider than the thickness of the sawblades. With sawblades, having a thickness of, for instance, 100 $\mu$m and provided with a diamond coating of, for instance, 20 $\mu$m thickness, on their end and the adjoining parts of the lateral surfaces one obtains a width of the saw cuts of about 150 $\mu$m. This facilitates the removal of the material sawed off accordingly.

We claim:

1. Apparatus for cutting up hard brittle material comprising
   (a) a base member;
   (b) a clamping frame;
   (c) a plurality of leaf springs supporting said frame on said base for oscillating motion along a first axis, said leaf springs disposed transversely to said first axis;
   (d) a plurality of saw blades disposed side by side in said clamping frame said saw blades extending in a direction parallel to said first axis;
   (e) means for holding material to be cut up and for bringing said material into contact with said saw blades;
   (f) first drive means for imparting a high frequency low amplitude oscillating motion to said support frame; and
   (g) second drive means for imparting a large amplitude low frequency to and fro motion to said means for holding said material to be cut up.

2. Apparatus according to claim 1 wherein said saw blades include teeth having front faces which face the material to be cut and a herein said faces contain diamond granules.

3. Apparatus according to claim 2 and further including holes in said saw blades, said holes chosen such that the cross-section of the saw blades is smaller in the middle than at their edge.

4. Apparatus according to claim 3 wherein said holes are selected such that when said saw blades are arranged in said frame, the elastic limit of the material of which that saw blades are made is at least approximately reached in the middle of said saw blades.

5. Apparatus according to claim 4 where, in the length direction of said saw blades and their direction of oscillating motion, said saw blades are inclined with respect to the vertical.

6. Apparatus according to claim 1 and further including holes in said saw blades, said holes chosen such that the cross-section of the saw blades is smaller in the middle than at their edge.

7. Apparatus according to claim 6 wherein said holes are selected such that when said saw blades are arranged in said frame, the elastic limit of the material of which the saw blades are made is at least approximately reached in the middle of said saw blades.

8. Apparatus according to claim 7 where, in the length direction of said saw blades and their direction of oscillating motion, said saw blades are inclined with respect to the vertical.

9. Apparatus according to claim 2 where, in the length direction of said saw blades and their direction of oscillating motion, said saw blades are inclined with respect to the vertical.

10. Apparatus according to claim 3 where, in the length direction of said saw blades and their direction of oscillating motion, said saw blades are inclined with respect to the vertical.

* * * * *